April 12, 1949.   A. CROT   2,466,795
HYDRAULIC OPERATING VALVE
Filed Nov. 22, 1944   2 Sheets-Sheet 1
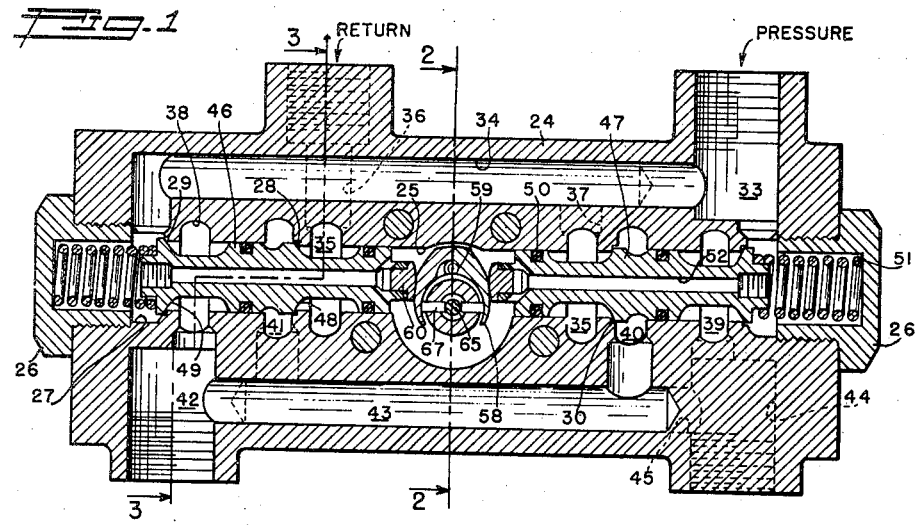
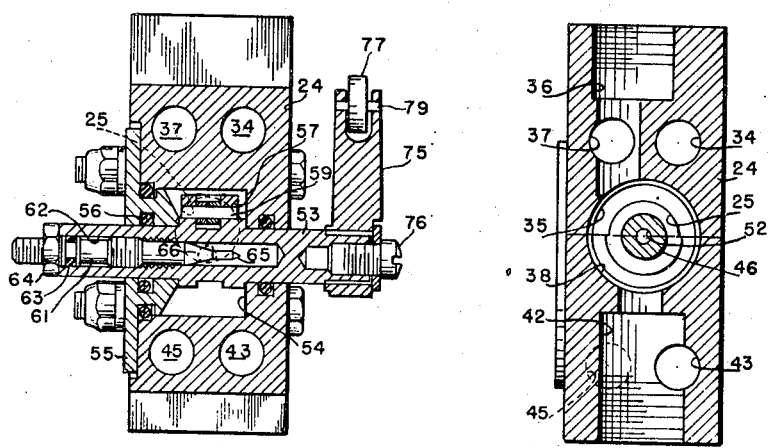
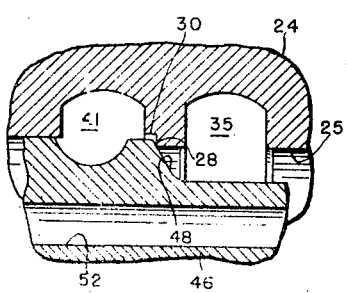
INVENTOR.
ANDRÉ CROT
BY
George C. Sullivan
AGENT April 12, 1949. A. CROT 2,466,795
HYDRAULIC OPERATING VALVE
Filed Nov. 22, 1944 2 Sheets-Sheet 2
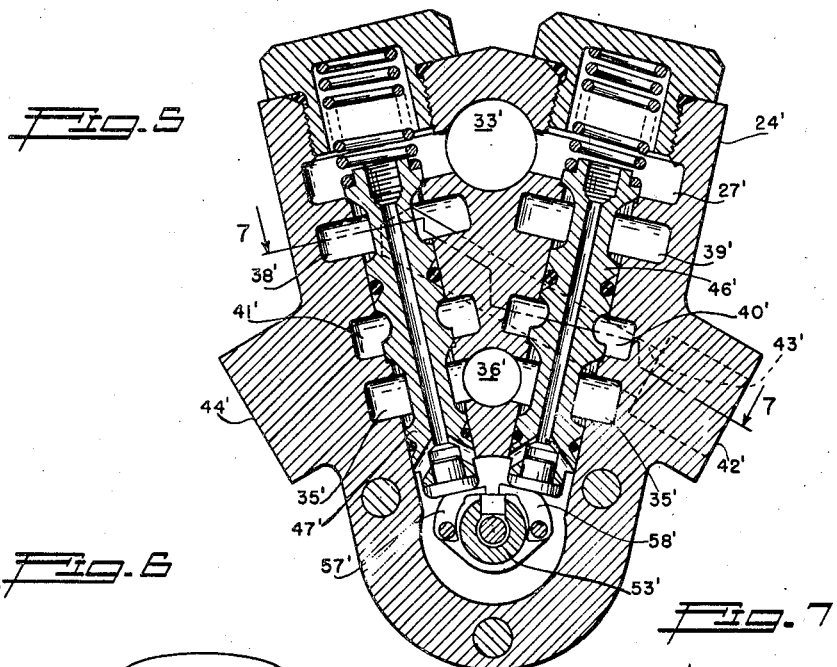
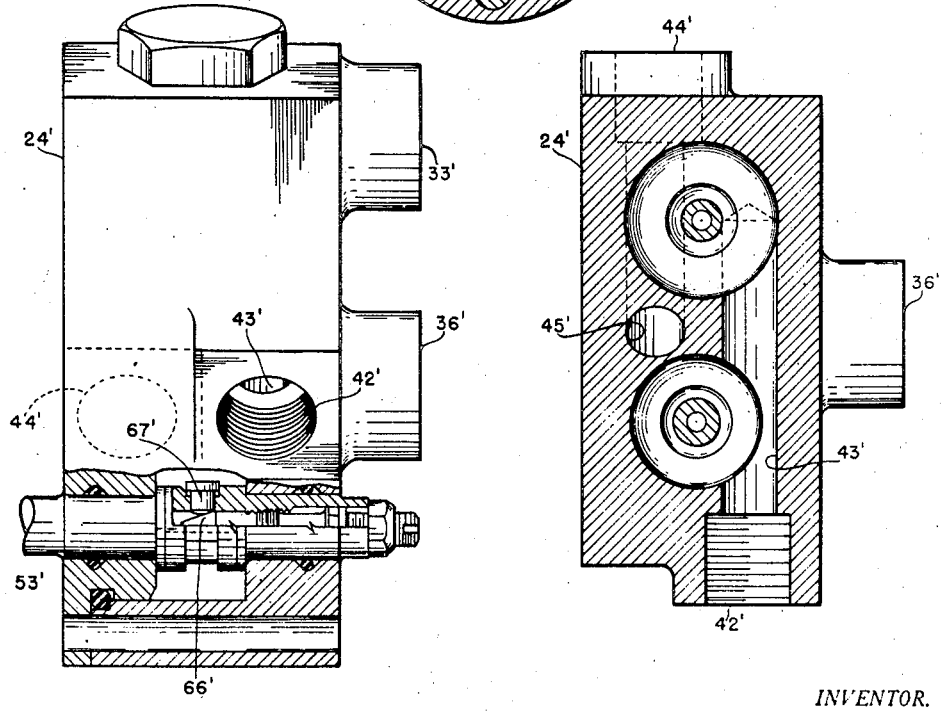
INVENTOR.
ANDRÉ CROT
BY George A. Sullivan
AGENT Patented Apr. 12, 1949

2,466,795

UNITED STATES PATENT OFFICE 2,466,795

HYDRAULIC OPERATING VALVE

André Crot, Topanga, Calif., assignor to Lockheed Aircraft Corporation, Burbank, Calif.

Application November 22, 1944, Serial No. 564,692

4 Claims. (Cl. 277—20)

This invention relates to hydraulic control or operating systems, and relates more particularly to four-way valves for hydraulic control systems.

Hydraulic operating systems are widely used where it is desired to provide for the power operation or control of remotely located elements or devices. Prior systems of this nature have had certain limitations and undesirable characteristics. For example, the valves of such systems have been extremely complicated and expensive to manufacture and have been difficult to operate when the actuating fluid is handled under high pressure. The valves often require expensive and complicated devices for compensating for thermal expansion and cannot be adjusted without considerable assembling.

One of the objects of this invention is to provide a valve of the character referred to that requires but very little force or physical exertion for its operation, even in instances where the actuating fluid is under high pressures.

Another object of this invention is to provide a hydraulic operating valve that remains accurate throughout long periods of usage and that may be quickly and easily adjusted without disassembling or disturbing any of its elements.

Another object of this invention is to provide a hydraulic four-way selector valve embodying a minimum number of parts and necessitating a minimum of machining during its manufacture. The valve provided by this invention embodies only three main elements, a one-piece body and two poppet valves, and the structure is such that no grinding is required for the valves.

Another object of the invention is to provide a four-way selector valve for use in hydraulic systems and the like, which is substantially balanced to be easy of operation even under high pressures. The movable elements or poppets of the valve, for example, may be 95% balanced in order to be operated or moved with a minimum application of force.

Another object of this invention is to provide a valve of the character referred to having improved throttle type seats which prevent erosion of the seats and provide a desirable throttling action as the valve elements or poppets move to their closed positions.

Another object of this invention is to provide a valve of the character referred to that is unaffected by temperature variations, the one-piece body and movable poppets being formed of the same material so that there is no thermal expansion differential to interfere with valve operations.

Another object of the invention is to provide a four-way valve for use in a fluid operating system which provides for the automatic relief of fluid pressure to remedy thermal expansion conditions at the fluid motor or power unit. The poppet elements of the valve have active valve faces graduated in diameter and related to the high and low pressure ports so that fluid pressure on the faces of larger diameter may unseat the valve to relieve the pressure condition brought about in the fluid power unit by reason of thermal expansion.

A further object of this invention is to provide a valve mechanism of the character referred to embodying a poppet operating cam means that may be readily adjusted from the exterior of the valve whereby the valve may be adjusted for correct operation while under working pressure without dismantling or disturbing any elements of the system.

Other objects and advantages of this invention will become apparent from the following detailed description of a typical preferred form of this invention, throughout which description reference may be had to the accompanying drawings in which:

Figure 1 is a detailed longitudinal sectional view of the aligned poppet form of my invention, in its neutral position;

Figure 2 is a cross-section on the line 2—2 of Figure 1 showing the adjusting mechanism for the setting of the valve cams.

Figure 3 is a cross-section on the line 3—3 of Figure 1 to more clearly show the differential diameters providing for expansion of the fluid in the system operated by the valve.

Figure 4 is an enlarged fragmentary sectional view illustrating one of the poppet seats.

Figure 5 is a transverse section of a modified form of my invention wherein the axes of the poppets are disposed at acute angle to each other to simplify the porting of the valve block.

Figure 6 is a side view of Figure 5, partly broken away to show the adjustable cam mechanism.

Figure 7 is an irregular section on the line 7—7 of Figure 5 showing the simplified porting in the valve block.

Two embodiments of the valve of this invention are shown in the drawings, both forms being functionally identical. The valve is in the nature of a four-way selector valve particularly suited for hydraulic systems of the character disclosed in my companion application of even date herewith, and also well adapted for use in practically any situation where a four-way selector valve is required. The improved valve of the invention has many features and advantages and is characterized by its simplicity of construction.

In Figures 1 to 4 inclusive, the valve includes a simple body 24 which may be a one piece unit. As illustrated, the body 24 is an integral elongate member. The valve body 24 may be formed of any selected material; for example, it may be constructed of aluminum, aluminum alloy, steel, or the like. A central longitudinal opening 25 extends through the body 24 from one end to the other and is closed at its opposite ends by screw threaded plugs 26. The opening 25 is cylindrical or round in cross section except for the fluid grooves, etc., to be hereinafter described. The central or intermediate portion of the opening 25 is somewhat smaller in diameter than its end portions and annular grooves or chambers 27 occur in the walls of the opening at the inner ends of the plugs 26.

The reduced middle portion of the opening 25 and the annular chambers 27 provide the walls of the opening 25 with two spaced pairs of shoulders. These shoulders are formed to constitute the valve seats 28 and 29. The valve seats 28 and 29 are of special design to eliminate the necessity of grinding and to provide a desirable throttling action upon closing of the poppets. Each shoulder 28 and 29 is provided with an annular groove or recess 30. The recesses 30 are open toward the longitudinal axis of the valve and toward the opposite ends of the body 24 to each have a circumferential wall and an axially facing wall. Figure 4 of the drawings clearly illustrates this construction in detail. The axially facing walls of the grooves 30 are preferably normal to the longitudinal axis of the opening 25 so that they join the wall of the opening at right angles or abrupt corners. These edges or corners form the valve seats 28 and 29. It will be observed that there is a pair of spaced seats 28 and 29 facing axially toward each end of the valve.

The valve body 24 has port systems communicating with its central opening 25. An actuating fluid pressure line and a return line extend to the valve body 24. The pressure line is connected in a radial opening 33 provided in one end portion of the body 24. The opening 33 may have direct communication with one of the annular end chambers 27. A port 34 extends longitudinally through the wall of the body 24 from the opening 33. The outer end of the port 34 has communication with the other end chamber 27. Thus the two end chambers 27 are in full communication with the pressure line at all times. It will be observed that the pressure supply line communicates with the body opening 25 adjacent to and outwardly of the outer seats 29.

The body 24 is ported so that the return line has communication with the opening 25 adjacent to but inwardly of the inner seats 28. Annular grooves 35 are provided in the wall of the reduced middle portion of the opening 25 in spaced adjacent relation to the seats 28. The return line communicates with a radial opening 36 in the body 24 which in turn leads directly to one of the grooves 35. A longitudinal opening 37 is formed in the wall of the body 24 and leads from the radial opening 36 to the other groove 35.

The valve body 24 is further ported to provide reversible delivery and return connections to a power unit which connections are in communication with grooves in the wall of the opening 25. Annular grooves 38 and 39 are provided in the wall of the opening 25 adjacent to but spaced inwardly from the outer seats 29. The grooves 38 and 39 are spaced between the outer seats 29 and the grooves 35. Similar annular grooves 40 and 41 are provided in the wall of the opening 25 adjacent to the inner seats 28. The grooves 40 and 41 are at the outer sides of the seats 28 and may join their grooves or recesses 30. One line from the power unit has communication with a radial port 42 in one end portion of the body 24. The radial port 42 may have direct communication with the groove 38. A port 43 extends longitudinally through the wall of the body 24 from the radial port 42 to the groove 40. Thus one line from the power unit has communication with the valve opening at a point adjacent the high pressure seat 29 of one pair of seats and has communication with the valve opening at a point adjacent the low pressure seat of the other pair of seats.

The other line from the power unit 10 is connected in a radial port 44 which may have direct communication with the groove 39. A passage 45 extends longitudinally through the wall of the body 24 from port 44 and has communication with the groove 41. The port 44 and the passage 43 put the other line in communication with the groove 39 adjacent the high pressure seat 29 of one set of seats and in communication with the groove 41 adjacent the low pressure seat 28 of the other pair of seats.

The improved four-way selector valve further includes two movable members for cooperating with the pairs of seats 28 and 29 to control the connection of the power unit lines with the pressure and return lines. These movable members of the valve are in the nature of simple poppets 46 and 47 and may be identical. The poppets 46 and 47 are elongate parts designed to move axially in the opening 25. In accordance with the invention, the poppets 46 and 47 are formed of the same material as the valve body 24. For example, if the body 24 is constructed of an aluminum alloy, the poppets 26 and 27 are formed of the same alloy. This completely avoids the difficulty frequently encountered in conventional valves as a result of thermal expansion effects on materials having different coefficients of expansion.

Each poppet 46 and 47 has two longitudinally spaced valve faces 48 and 49 for cooperating with the inner and outer seats 28 and 29 respectively. The valve faces 48 and 49 are annular and are tapered to have line contact with their respective seats, the seats being in the nature of abrupt or substantially right angle corners as above described. The outer faces 49 which cooperate with the outer seats 29 are slightly larger in diameter than the inner seats 48 to provide for a slight desirable unbalancing of the poppets. The valve faces 48 and 49 are spaced and related to simultaneously cooperate with their respective seats. As clearly illustrated in Figure 2 of the drawings, the poppets 46 and 47 may be externally grooved at the body grooves 35, 38, 39, 40 and 41 to provide for free fluid flow and to reduce the areas of contact of the poppets with the wall of the body opening 25.

Means are provided for slidably sealing between the poppets and the wall of the body opening 25 at points or zones between the seats 28 and 29 and inwardly of the seats 28. In the simple illustrative form of the invention as shown, sealing rings 50 of flexible resilient material are provided in grooves in the poppets 46 and 47 to slidably seal with the wall of the opening 25 at zones inwardly of grooves 38 and 39 and at zones inwardly of the grooves 35. Means are provided for normally urging the poppets 46 and 47 to their closed positions. These means comprise coiled springs 51 arranged under compression between the plugs 26 and the outer ends of the poppets. The inner sides of the plugs 26 may be socketed to receive the springs 51 and the outer ends of the poppets 46 and 47 may have centering bosses for entering the ends of the springs.

Central longitudinal pressure equalizing passages 52 extend through the poppets 46 and 47. The outer ends of the passages 52 have communication with the pressure chambers 27 and the inner ends of the passages communicate with the open middle portion of the opening 25. Thus the opposite ends of the poppets 46 and 47 are subjected to the same fluid pressure, but owing to the graduated diameters of the opening 25 and surfaces 48 and 49 the poppets resemble differential pistons, having slightly smaller areas exposed at their inner, then at their outer, ends to be slightly hydraulically unbalanced.

The invention includes a particularly effective adjustable means for operating valve poppets 46 and 47. The valve operating means is such that the valve 11 may be easily and quickly adjusted from the exterior of the valve body 24 without disassembling any of the valve elements. The operating means includes a cam shaft 53 extending through a central transverse opening 54 in the body 24; see Figure 3. One end of the opening 54 is enlarged and is closed by a plate 55 bolted to the body 24. The shaft 53 is rotatably supported in the plate 55 and projects outwardly beyond the plate. Sealing rings 56 in the opening 54 and plate 55 seal around the shaft. A split lug 57 is provided on the shaft 53 within the opening 54. A pair of cam shoes 58 is pivoted or hinged to the lug 57 by a pin 59. The shoes or cams 58 hang at opposite sides of the shaft 53 and are provided to operate the poppets 46 and 47. The inner ends of the poppets have heads 60 presenting rounded surfaces for engagement by the cams 58. The cams 58 have curved or convex surfaces for cooperating with the poppet heads 60. The curvature of the cam surfaces is such that rotation of the shaft 53 in one direction moves one cam surface against a poppet head, to move that poppet axially, while the other cam surface moves away from the other poppet head 60 to leave the other poppet undisturbed.

The cams 58 are adjustable to take up all play in the valve operating mechanism and to assure correct operation of the valve. The adjusting means includes a stem 61 entering a longitudinal opening 62 in the cam shaft 53. The stem 61 is rotatably supported in the opening 62 by a bearing 63 and is threaded in the opening for advancement and retraction. A lock nut 64 may serve to lock the stem in the adjusted position. The inner end of the stem 61 has a point or pilot 65 and a frusto-conical face 66 at the base of the pilot. Push pins 67 cooperate with the inner sides of the cams 58 and are slidably supported in a transverse opening in the shaft 53. The inner ends of the push pins 67 are engaged by the frusto-conical face 66 of the adjusting stem. When the stem 61 is first introduced into the opening 62 its pilot 65 engages between the pins 67 to move them apart. Inward adjustment of the stem 61 causes the frusto-conical face 66 to force the pins 67 outwardly and thus adjust the cams 58 outwardly. Outward retraction of the stem 61 allows the cams 58 to move toward one another. Such adjustments of the cams 58 may be performed from the exterior of the valve body 24 and the adjusting stem 61 may be set or locked in the required position by means of the nut 64.

In operation let it first be assumed that the line to 33 is supplied with fluid under substantially uniform pressure and that the parts are in the normal or neutral positions illustrated in Figure 1. Under this normal condition the poppets 46 and 47 are substantially balanced. The ports 52 in the poppets connect the chambers 27 with the central portion of the opening 25 so that equal pressure is applied to the opposite ends of the poppets. However, because of the differences in diameters of the surfaces 48 and 49 the poppets are slightly unbalanced and in the event that excessive fluid pressure develops in the power unit because of thermal expansion, the excessive pressure exerted on the larger surface 49 of a poppet will unseat the poppet to relieve such excess pressure. Thus the valve of the invention automatically relieves excess pressures that may develop in the power system.

Operation of the valve may be manual or remote controlled in any desired manner, but for the purposes of this disclosure it may be assumed that the lever 75 is manually shifted. Let it be assumed that the lever 75 has been moved in a direction to unseat the poppet 46. Opening of the poppet 46 allows the actuating fluid pressure to flow from a chamber 27 to the groove 38 and through the port 42 to one side of a power unit. At the same time the surface 48 moves away from the seat 28 to put the passage 45 in communication with the groove 35 and the return port 36. Thus the line from the other side of the power unit is put into communication with the fluid return line. With the power unit lines thus connected through the valve with the pressure and return lines the power unit is caused to operate in a desired direction. It is to be observed that the poppet 46 is substantially balanced and is easily operated or unseated.

When the lever 75 is restored to its neutral position the poppet moves toward its closed position and its valve surfaces 48 and 49 approach the seats, the grooves or recesses 30 provide a throttling action. This throttling action occurs behind or rearwardly of the seats proper and the seats are not subjected to erosion. The throttling action at the seats also accelerates the closing movement. During the last phase of the closing movement, the fluid pressures on the opposite ends of the poppet are substantially equal and the poppet closes gently. The valve is designed so that its poppets are easy to operate and operate smoothly and without erosion even when handling fluid under very high pressures.

Because of the close similarity of the form of the invention shown in Figures 5 to 7 to that just described, it will be convenient to use primed numbers to identify similar parts in order to render the operation of the two forms more easily understandable. The chief difference between the two forms of the invention resides in the arrangement of the two valve axes at an acute angle to simplify the porting in the valve block 24'. Similar poppet valves 46' and 47' are arranged in identical bores 25' forming a V, with the camshaft 53' at the apex of the V. While the adjustable cams 57' and 58' require modification in form, they function as previously described and are adjusted by a cone 66' as in the previous embodiment. With the V arrangement, pressure fluid is applied at the connection 33', while ports 42' and 44' connect to the power unit to be operated. It will be noted that the connection 33' communicates directly with the end chambers 27' of each bore, while the connection 36' opens directly into the grooves 35' inwardly of the inner seats of the poppets, so that with the camshaft 53' in neutral, as shown in Figure 5, both connections are sealed off from the power unit ports.

The power unit connection port 42' has a single angularly extending aligned passage 43' which opens into the lower middle chamber or groove 40' for the right valve in Figure 5 and the upper middle groove 38' for the left valve. Similarly port 44' has an aligned passage 45' leading to the lower middle groove 41' of the left valve and the upper middle groove 39' of the right valve in Figure 5. Thus all passages in the valve block are formed by direct drilling without cross-drilling or end plugs, greatly simplifying the manufacture of the valve block. The operation of this form of the invention is functionally identical with that previously described.

Having described typical forms of the invention, I do not wish to be limited to the specific details herein set forth, but wish to reserve to myself any variations or modifications that may appear to those skilled in the art or fall within the scope of the following claims.

I claim:

1. In a hydraulic system of the character described, a valve body having inclined and intersecting openings, pressure chambers at the outer ends of the openings and sets of ports communicating with the openings in spaced relation to the chambers, a hydraulically balanced poppet in each opening for controlling each set of ports, the outer ends of the poppets being exposed to the pressure in said chambers, the poppets having passages extending from their outer ends to their inner ends whereby to transmit the working pressures to the opposite ends of the poppets, and means for operating the poppets.

2. In a hydraulic system of the character described, a valve body having a pair of intercommunicating openings, pressure chambers at the outer ends of the openings and sets of ports communicating with the openings in spaced relation to the chambers, a hydraulically balanced poppet in the opening for controlling each set of ports, the outer ends of the poppets being exposed to the pressure in said chambers, the poppets having passages extending from their outer ends to their inner ends whereby to transmit the working pressures on the opposite ends of the poppets, spring means for urging the poppets inwardly to closed positions, and means for selectively opening the poppets comprising a cam unit engaging the inner ends of the poppets.

3. In a hydraulic system of the character described, a four-way selector valve comprising a body having a pressure port, a pressure return port, a first control port and a second control port and a pair of valve openings terminating in closed chambers at both ends of said openings, which chambers are in communication with each other, a poppet in each opening having pressure balancing central passages maintaining communication between the chambers at each end, each poppet adapted when lifted to put one control port in communication with the pressure port and the other control port in comunication with the pressure return port, and selective means in one of said closed chambers and normally contacting both poppets when in its neutral position for operating the poppets alternatively.

4. In a four-way hydraulic valve system having a pair of alternatively operated valve poppets, an oscillatable camshaft disposed with its axis intersecting the axes of both poppets, adjustable cam shoes carried by said camshaft, said cam shoes being eccentrically and oppositely disposed on said crankshaft to separately contact said poppets, and means for adjusting the eccentricity of said cam shoes comprising an adjustable stem disposed centrally of said cam shaft and longitudinally adjustable relative thereto to simultaneously expand said cam shoes.

ANDRÉ CROT.

REFERENCES CITED

The following references are of record in the file of this patent:

UNITED STATES PATENTS

| Number | Name | Date |
|---|---|---|
| 702,383 | Tyson | June 10, 1902 |
| 733,220 | Krebs | July 7, 1903 |
| 1,080,495 | Steinbecker | Dec. 2, 1913 |
| 1,252,940 | Osborne | Jan. 8, 1918 |
| 1,595,458 | Doolittle | Aug. 10, 1926 |
| 1,850,209 | Knox | Mar. 22, 1932 |
| 2,134,208 | Schofield | Oct. 25, 1938 |
| 2,249,656 | Huband | July 15, 1941 |
| 2,276,630 | Sheppard | Mar. 17, 1942 |
| 2,294,702 | VanDerWerff | Sept. 1, 1942 |
| 2,323,947 | VanDerWerff | July 13, 1943 |